United States Patent
Zhao et al.

(10) Patent No.: US 8,501,877 B2
(45) Date of Patent: Aug. 6, 2013

(54) THERMOSETTING COMPOSITIONS CONTAINING ISOCYANURATE RINGS

(75) Inventors: Ming Yang Zhao, Kansas City, MO (US); Chih-Pin Hsu, Parkville, MO (US)

(73) Assignee: CCP Composites US LLC, North Kansas City, MO (US)

( * ) Notice: Subject to any disclaimer, the term of this patent is extended or adjusted under 35 U.S.C. 154(b) by 338 days.

(21) Appl. No.: 12/732,568

(22) Filed: Mar. 26, 2010

(65) Prior Publication Data

US 2010/0256285 A1 Oct. 7, 2010

Related U.S. Application Data

(60) Provisional application No. 61/166,281, filed on Apr. 3, 2009.

(51) Int. Cl.
*C08K 5/07* (2006.01)
*C08L 63/02* (2006.01)
*C08L 67/00* (2006.01)
*C08G 63/12* (2006.01)
*C08G 63/47* (2006.01)

(52) U.S. Cl.
USPC .................. 525/438; 523/454; 528/291

(58) Field of Classification Search
None
See application file for complete search history.

(56) References Cited

U.S. PATENT DOCUMENTS

| | | | |
|---|---|---|---|
| 3,660,327 A | 5/1972 | Loncrini et al. | |
| 3,763,097 A | 10/1973 | Edelman | |
| 3,784,503 A | 1/1974 | Pregler | |
| 3,919,144 A * | 11/1975 | Formaini et al. | 525/501.5 |
| 4,942,215 A | 7/1990 | Greco et al. | |
| 5,003,040 A | 3/1991 | Kooymans et al. | |
| 5,066,763 A | 11/1991 | Andre et al. | |
| 5,268,428 A | 12/1993 | Wamprecht et al. | |
| 5,747,590 A | 5/1998 | Corcoran et al. | |
| 6,667,078 B2 | 12/2003 | Shimada et al. | |
| 7,425,594 B2 | 9/2008 | Martz et al. | |
| 2001/0051695 A1 | 12/2001 | Crump | |
| 2007/0049686 A1 | 3/2007 | Bauchet | |
| 2008/0160307 A1 | 7/2008 | Bauchet et al. | |
| 2009/0076218 A1 | 3/2009 | Zhao et al. | |
| 2010/0204392 A1 * | 8/2010 | Marsh et al. | 524/539 |
| 2010/0256285 A1 | 10/2010 | Zhao et al. | |

FOREIGN PATENT DOCUMENTS

| | | |
|---|---|---|
| JP | 59157074 | 9/1984 |
| JP | 60123478 | 7/1985 |
| JP | 2007099901 | 4/2007 |
| JP | 2007099901 A | 4/2007 |

* cited by examiner

*Primary Examiner* — Robert Sellers
(74) *Attorney, Agent, or Firm* — Whyte Hirschboeck Dudek S.C.

(57) ABSTRACT

The invention relates to thermosetting compositions containing isocyanurate ring(s) prepared through chain extension of an epoxy resin (a) with carboxyl-functional oligomers (b), which are the reaction product of polyols (i) containing one or more isocyanurate ring(s) and polycarboxylic acids or their anhydrides (ii). The polyols (i) containing one or more isocyanurate ring(s) can be prepared from the reactions of tris (2-hydroxyalkyl) isocyanurates with a modifier from a caprolactone or alkylene oxide, or glycidyl ester or glycidyl ether and mixtures thereof. The epoxy-functional thermosetting compositions containing an isocyanurate ring(s) can be further reacted with unsaturated acids, preferably (meth)acrylic acid, to obtain a curable polyacrylate. Both epoxy-functional isocyanurate and acrylate-functional isocyanurate thermosetting compositions can be further modified with a polyisocyanate to produce a composition that is useful as a reactive adhesive, binder or in other applications.

13 Claims, No Drawings

THERMOSETTING COMPOSITIONS CONTAINING ISOCYANURATE RINGS

CROSS-REFERENCE TO RELATED APPLICATION

This application claims the benefit of pending U.S. Provisional Patent Application No. 61/166,281 entitled "Thermosetting Composites Containing Isocyanurate Rings" filed on Apr. 3, 2009, which is hereby incorporated by reference herein.

FIELD OF THE INVENTION

This invention relates to a thermosetting composition containing isocyanurate rings. The isocyanurate ring is incorporated into the thermosetting composition through chain extension of the thermosetting resin.

BACKGROUND OF THE INVENTION

Tris (2-hydroxyalkyl) isocyanurates are commercial raw materials that have been used for preparing coating resins and thermosetting compositions containing an isocyanurate ring. The presence of an isocyanurate ring can improve the properties of the resins such as resistance towards thermal aging, weathering, UV light, low shrinkage, or improved mar resistance. Tris (2-hydroxyalkyl) isocyanurates can be incorporated into coating resins and thermosetting compositions as a polyol in the synthesis of polyester or polyether. However, there are disadvantages of using tris (2-hydroxyalkyl) isocyanurates, such as its higher melting point, higher viscosity, low solubility, low reactivity, and less flexible, as a polyol in the synthesis of a polyester or polyether. To overcome such disadvantages, some modified tris (2-hydroxyalkyl) isocyanurates and their derivatives have been reported. For example, U.S. Pat. No. 5,268,428 discloses the use of caprolactone and tris (2-hydroxyethyl) isocyanurates (THEIC) to prepare hydroxyl functional polyester used in binder compositions. U.S. Pat. No. 5,747,590 reported the use of caprolactone/THEIC oligomers for coating compositions. U.S. Pat. No. 7,425,594 reported copolymers produced from the reaction of glycidyl ester and/or ether with THEIC.

Tris (2-hydroxyalkyl) isocyanurates and their derivatives have also been used as cross-linking agents for epoxy and polyurethane resins. U.S. Pat. No. 4,942,215 describes a reaction product of THEIC and an equivalent quantity of one or more anhydrides, which is combined with epoxy resin and liquid anhydride in a thermosetting liquid molding composition. U.S. Pat. No. 6,667,078 describes a reaction product of acid anhydride and THEIC as a curing agent in the manufacture of a transparent resin plate for a liquid crystal display. The use of the reaction product of polycaprolactone and THEIC in a urethane coating composition has been described in U.S. Pat. No. 3,784,503.

JP Patent No. 60123478 describes an ester compound containing an isocyanuric ring having improved heat resistance and surface hardness free from brittleness, which is liquid at normal temperature and easily handleable, produced from a reaction product of epsilon ($\epsilon$)-caprolactone modified tris (hydroxyalkyl) isocyanurate and acrylic acid or methacrylic acid.

Tris (2-hydroxyalkyl) isocyanurates and their derivatives have also been used to produce epoxy resins. U.S. Pat. No. 3,763,097 describes a polyether epoxy resin prepared by reacting diepoxides with THEIC under the acid pH conditions. U.S. Pat. No. 5,003,040 describes modified epoxy resins prepared from the reaction of diglycidyl ether and THEIC in the presence of an etherification catalyst. The modified epoxy resin has an average of 1.5 to 2.5 epoxy groups and at least one primary hydroxyl group per molecule. A curable coating composition based on a modified epoxy resin is described in U.S. Pat. No. 5,066,763. JP Patent No. 2007099901 describes an epoxy resin with low curing shrinkage, transparency, excellent light fastness, and low yellowing under high temperatures. The epoxy resin is obtained by reacting a polycarboxylic acid compound (A) and a non-aromatic epoxy resin (B) under a basic catalyst, wherein the compound (A) is obtained by reacting tris (hydroxy alkyl) isocyanuric acid and an anhydride of a saturated acid.

Many curable resins compositions made directly with tris (2-hydroxyethyl) isocyanurate exhibit application properties that are less than desirable. For example, some compositions can result in films that do not exhibit sufficiently high strength or hardness. Other compositions can result in films that are not sufficiently flexible. Still other compositions can result in films that are brittle. Other problems, such as wrinkling or poor adhesion (which can result in delamination) can also be experienced.

It is thus an object of this invention to develop a thermosetting composition that utilizes an isocyanurate-based polyol, and is capable of producing a cured resin having the desired properties described above.

DESCRIPTION OF THE INVENTION

The present invention provides thermosetting compositions containing isocyanurate rings, comprising the reaction product of:
(a) a polyepoxide containing at least two epoxide groups per molecule, and
(b) a carboxyl functional oligomer formed by reacting:
(i) a polyol containing one or more isocyanurate rings produced from the reaction of tris-(2-hydroxyalkyl) isocyanurate or derivative thereof with a modifier selected from a caprolactone, an alkylene oxide, a glycidyl ester, a glycidyl ether, and mixtures thereof,
with an equivalent quantity of
(ii) one or more polycarboxylic acids or anhydrides thereof;
wherein, the molar ratio of epoxy functional groups of component (a) to the acid functional groups of component (b) is greater than 1.0, and preferably greater than 1.5.

As used herein, the term "thermosetting compositions" means thermosetting resin compositions and both terms may be used in the present invention with the same meaning (presence of a thermosetting resin).

Polyols (i) containing one or more isocyanurate rings used in the invention are made from the reaction of a tris-(2-hydroxyalkyl) isocyanurate or derivative thereof with a modifier selected from caprolactones, alkylene oxides, glycidyl esters, glycidyl ethers, and mixtures thereof. The molar ratio of the hydroxyl groups of the tris-(2-hydroxyalkyl) isocyanurate to the functional groups, which may be epoxy or cycloester, in the said modifier may be from 0.25 to 4 and preferably from 0.5 to 2. The said tris (2-hydroxyalkyl) isocyanurate is preferably tris (2-hydroxyethyl) isocyanurate or tris (2-hydroxypropyl) isocyanurate.

From the reaction of component (a) with component (b) under the conditions as disclosed above, epoxy-functional thermosetting compositions containing isocyanurate rings result.

Epoxy functional thermosetting compositions additionally bearing unsaturated epoxy ester groups can also be produced according to the invention as the reaction product of components (a), (b) and of an additional component (c), with components (a) and (b) being as defined above and the said additional component (c) being an unsaturated carboxylic acid, particularly ethylenically unsaturated and preferably selected from acrylic and/or methacrylic acid, in such a proportion with respect to components (a) and (b) that both functional groups epoxy and unsaturated epoxy esters (bearing secondary OH group) are present in the final product. Such a composition, in particular with partial conversion of epoxy groups to unsaturated ester groups, is preferably used in dual cure compositions with successive or simultaneous polycondensation and free radical cures.

According to another embodiment, the said component c) is selected in such a proportion that all epoxy functional groups are converted to unsaturated epoxy ester groups, and when the said acid component c) is acrylic or methacrylic acid, the derived reaction product is thus a polyacrylate (multifunctional acrylate or methacrylate).

According to another embodiment, the said epoxy-functional thermosetting compositions containing isocyanurate rings, resulting from the reaction of component (a) with component (b), can be further reacted via the epoxy groups with said unsaturated carboxylic acid(s) component (c), to convert partially or totally (completely), the said epoxy groups to the corresponding unsaturated epoxy esters, bearing a secondary hydroxyl and preferably when the said unsaturated acid component (c) is (meth)acrylic acid to obtain a curable polyacrylate (multifunctional acrylate or methacrylate) composition. The epoxy functional group in the thermosetting composition can be partially or completely reacted with the said unsaturated acid, which enables to have different reactivity by free radical route. When all epoxy free groups are converted to the said unsaturated epoxy ester groups, either by direct route via the reaction between components (a), (b) and (c) or via the indirect route by further post-reacting the epoxy-functional composition (product of (a)+(b)) with said component (c), the said composition is free radical curable and can preferably be a curable polyacrylate composition when the said component (c) is acrylic and/or methacrylic acid.

Both epoxy-functional thermosetting compositions containing isocyanurates (isocyanurate rings) and unsaturated epoxy ester-functional groups, preferably acrylate-functional groups, can be further modified with a polyisocyanate, and are useful as a reactive adhesive, binder and/or in other applications for thermosetting resins.

The thermosetting compositions of the present invention can be dissolved in a solvent such as acetone, or a monomer such as styrene, to form a resin solution.

The thermosetting compositions containing isocyanurate rings of the present invention are prepared through multiple steps, and the details of each step are described below as follows:

(1) Preparation of Polyols (i) Containing One or More Isocyanurate Rings:

Polyols containing one or more isocyanurate rings are prepared by reaction of tris-(2-hydroxyalkyl) isocyanurate or derivative thereof, with a modifier selected from caprolactones, alkylene oxides, glycidyl esters, glycidyl ethers, and mixtures thereof. Unmodified tris-(2-hydroxyalkyl) isocyanurates are not suitable in the present invention as part of the polyol component due to the higher melting point, higher viscosity, low solubility, low reactivity, and less flexibility. Tris (2-hydroxyethyl) isocyanurates and tris (2-hydroxypropyl) isocyanurates are preferred for preparing the isocyanurate ring-containing polyols (i). The molar ratio of the hydroxyl groups from the tris-(2-hydroxyalkyl) isocyanurate component to the functional groups from the said modifier component may vary from 0.25 to 4, preferably from 0.5 to 2 in the reaction composition.

The reaction to form the said polyols (i) is typically conducted with a catalyst and at an elevated temperature, for example, as described in JP Patent No. 59157074. Tris (2-hydroxyethyl) isocyanurate can be reacted with epsilon-caprolactone in a weight ratio of about (95:5) to (5:95), preferably about (80:20)-(20:80) to produce a modified tris(2-hydroxyethyl) isocyanurate (polyol (i)) having a flowing or flowable state with a viscosity of less than about 50,000 mPa·s (cP) at 30° C. The reaction of cyanuric acid with alkylene oxides is described, for example, in J. Org. Chem. 28, (1963) 85-89, with the resulting product being a tris (2-hydroxyalkyl) isocyanurate containing primary hydroxyl groups.

(2) Preparation of Carboxyl Functional Oligomers (Component (b)):

The carboxyl functional oligomers (b), are prepared by reaction of a polyol (i) containing one or more isocyanurate rings as described above at (1), with an equivalent quantity of one or more polycarboxylic acids or their anhydrides. Acid anhydrides are preferred in the preparation of the carboxyl functional oligomers (b). Preferred acid anhydrides include maleic anhydride, succinic anhydride, dodecenylsuccinic anhydride, itaconic anhydride, citraconic anhydride, adipic anhydride, hexahydrophthalic anhydride, methyl-hexahydrophthalic anhydride, nadic anhydride, endo-cis-bicyclo(2,2,1)-5-heptene-2,3-dicarboxylic anhydride, methyl nadic anhydride, tetrahydrophthalic anhydride, methyltetrahydrophthalic anhydride, phthalic anhydride and tetrachlorophthalic anhydride.

The reaction between isocyanurate-based polyols (i) and the aforesaid acids or anhydrides (ii) is typically conducted by heating the reagents to a temperature of about 120 to 180° C., which can be conducted in the presence of catalytic quantities of a basic organic compound containing nitrogen.

(3) Preparation of Thermosetting Compositions Containing Isocyanurate Rings:

Thermosetting compositions containing isocyanurate rings are prepared by the reaction of carboxyl functional oligomers as described above at (b) with an aliphatic, cycloaliphatic or aromatic polyepoxide (a), which is liquid at ambient temperature (20 to 25° C.) and contains two or more epoxide groups per molecule. The molar ratio of epoxy functional groups of (a) to the acid functional groups of (b) is greater than 1.0, preferably greater than 1.5, such that the reaction product contains epoxy functional groups. The reaction of polyepoxides (a) and carboxyl functional oligomers (b) should be carefully controlled such that the thermosetting resin does not cross-link during the reaction.

In particular, the said polyepoxides (a) can be chosen from phenol glycidyl derivatives, for example, the bis-glycidyl derivatives of bishydroxyphenylmethane and bishydroxyphenyl propane; polyglycidyl ethers of the condensation products of phenol with formaldehyde (epoxy novolac resins); N-glycidyl derivatives of aromatic amines such as tetraglycidylamino diphenylmethane and diglycidylaniline; glycidyl esters such as diglycidyl phthalate, diglycidyl tetrahydrophthalate and diglycidyl methyltetrahydrophthalate; di- or poly-glycidylethers of a glycol or triazine such as diglycidylether of cyclohexanediethanol and diglycidylether of dihydroxycyclohexylmethane; triglycidylisocyanurates; and diolefin diepoxides such as cyclohexenedioxide and dicyclopentadiene dioxide.

Of these, the polyepoxides derived from the reaction of bisphenol A with epichlorohydrin are preferred.

The epoxy-functional thermosetting compositions (resins) containing isocyanurate rings as disclosed in (3) above as resulting from the reaction of (a) with (b), can be further reacted with unsaturated carboxylic acids, for example, acrylic acid and methacrylic acid, to obtain a curable polyacrylate. The epoxy functional group in the thermosetting composition (resin) can be partially or completely reacted with the unsaturated acid to have different reactivity by free radical.

Both epoxy-functional thermosetting compositions containing isocyanurate rings, and unsaturated epoxy esters functional groups, preferably acrylate-functional thermosetting compositions containing an isocyanurate ring(s), can be modified with polyisocyanates and are useful as a reactive adhesive, binder or in other applications. The amount of polyisocyanate modifier can be from about 0.1 to 30% by weight of the total composition. The amount of polyisocyanate used in a modification reaction should be calculated based on the functionality of the composition such that the thermosetting composition will not cross-link during the polyisocyanate modification reaction. The conditions to avoid such a non desirable cross-linking or gelation, are well-known to one skilled in the art. See, for example, Paul Flory, *Principles of Polymer Chemistry*, Cornell University Press, NY, pp. 348-361 (1953). The glass transition temperature (Tg) of the polyisocyanate-modified thermosetting compositions containing isocyanurate ring(s) of this invention is generally less than 50° C. and preferably less than 45° C.

Useful polyisocyanate modifiers that can be utilized include monomeric polyisocyanates such as isophorone diisocyanate, trimethylhexamethylene diisocyanate, dicyclohexylmethane diisocyanate, and toluene diisocyanate; isocyanurates and biurets of monomeric isocyanates such as the isocyanurate of isophorone diisocyanate, the isocyanurate of hexamethylene diisocyanate, or the biuret of hexamethylene diisocyanate; and oligomers or prepolymers of isocyanates. Oligomers or prepolymers of isocyanates can be formed by the reaction of an excess of polyisocyanate equivalents with a compound containing more than one isocyanate reactive group.

The reaction of polyisocyanate and of the thermosetting composition containing an isocyanurate rings can be carried out under mild conditions. Although it is not required, it is preferable to carry out the reaction with the use of a catalyst. The reaction temperature can be between 0 and 100° C., with the reaction typically carried out at between room temperature and 75° C. The catalyst, if used, may be chosen from a number of catalysts known in the art that are functional to promote an isocyanate-hydroxyl reaction. Examples of such catalysts include tin compounds such as dibutyltin oxide and dibutyltin dilaurate. The said polyisocyanate-modified epoxy-functional thermosetting composition and/or the polyisocyanate-modified polyacrylate composition as defined above can particularly be used in reactive adhesives or reactive binders.

The said polyepoxide (a) can be selected from the group consisting of an aliphatic, cycloaliphatic or aromatic polyepoxides which are liquid at ambient temperature (20 to 25° C.) and contain two or more epoxide groups per molecule. Preferably, the said polyepoxide (a) is derived from a reaction of bisphenol A with epichlorohydrin.

The said carboxyl-functional oligomer (b) can particularly comprise the reaction product of a polyol (i) containing one or more isocyanurate rings with an equivalent quantity of one or more carboxylic acids or acid anhydrides (ii) and preferably with said acid anhydride selected from the group consisting of maleic anhydride, succinic anhydride, dodecenylsuccinic anhydride, itaconic anhydride, citraconic anhydride, adipic anhydride, hexahydrophthalic anhydride, methylhexahydrophthalic anhydride, nadic anhydride, methylnadic anhydride, tetrahydrophthalic anhydride, methyltetrahydrophthalic anhydride, phthalic anhydride and tetrachlorophthalic anhydride.

Under ambient temperature conditions, the thermosetting compositions of the present invention can be dissolved in a solvent(s) or monomer(s) that give the composition good workability, to obtain a resin solution having a viscosity of between about 20 and 20,000 mPa·s (cP).

Examples of suitable monomers include, among others, aromatic compounds such as styrene, alpha-methylstyrene, dichlorostyrene, vinyl naphthalene, vinyl phenol and the like; unsaturated esters such as acrylic and methacrylic esters, vinyl laurate, and the like; unsaturated acids such as acrylic and alpha-alkylacrylic acids such as methacrylic acid, butenoic acid, allylbenzoic acid, vinylbenzoic acid, and the like; and halides such as vinyl chloride and vinylidene chloride; and nitriles such as acrylonitrile and methacrylonitrile; diolefins such as butadiene, isoprene and methylpentadiene; esters of polycarboxylic acids such as diallyl phthalate, divinyl succinate, diallyl maleate, divinyl adipate, dichloroallyl tetrahydrophthalate, and the like; and mixtures thereof.

The thermosetting compositions include the solvents used in the synthesis of the reactive components as disclosed above, and preferably additional solvent(s) that can be added as a processing aid, e.g., during formulation of the resin composition, in order to enhance its application characteristics. The inclusion of solvent(s) can aid the flow and leveling of the applied resin or adhesive. Moreover, if the resin is applied by means of spraying, a solvent can be added to improve the atomization of the resin composition.

Examples of useful solvents are acetates such as butyl acetate, hexyl acetate, and octyl acetate; glycol ethers and glycol ether acetates such as propylene glycol ether and propylene glycol monomethyl ether acetate; and ketones such as acetone, methyl ethyl ketone, methyl propyl ketone, methyl isobutyl ketone and methyl hexyl ketone.

The thermosetting composition according to the invention may further comprise an additive selected from the group consisting of organic fillers, inorganic fillers, thixotropic agents, dyes and inhibitors or it may further comprise a cross-linking agent.

Pigments, if used, can be incorporated as pastes prepared by using grinding resins or pigment dispersants according to methods well known in the art. The term "pigments" is meant to encompass organic and inorganic compounds that are colored materials, fillers, metallic and flake materials, and other like materials known in the art.

The compositions of the present invention are particularly suitable for use as a reactive adhesive, binder, curable laminate resin, and two-component epoxy resin. The compositions can be used in adhesives, molding compositions or laminate composite compositions. Compositions with unsaturated ester groups are convenient for cure by free radical route. All compositions comprising epoxy groups (alone or in part) may be used in epoxy thermosetting compositions.

Finally the invention also relates to a molded article, which results from the cure of at least one thermosetting composition as defined above according to the invention.

The following experimental examples illustrate but do not limit the scope of the present invention.

EXAMPLE 1

Preparation of a Polyol (i) Containing Isocyanurate Ring

A reactor is charged with 641 g of tris (2-hydroxyethyl) isocyanurate (THEIC), 1103 g of ε-caprolactone and 0.2 g of tetrabutyl titanate under a nitrogen atmosphere. The mixture is heated to 140° C. for 6 hours under effective stirring to obtain a reaction product of polyol.

EXAMPLE 2

Preparation of a Carboxyl Functional Oligomer (b)

A reactor is charged with 1692 g of polyol from Example 1, 1100 g of hexahydrophthalic anhydride (HHPA) under a nitrogen atmosphere. The mixture is heated to 140° C. for 6 hours under effective stirring to obtain a reaction product of polycarboxylic acid oligomer.

EXAMPLE 3

Preparation of a Polyepoxide (a) Solution

A reactor is charged with 576 g of polycarboxylic acid oligomer from Example 2, 556 g of bisphenol-A diglycidyl ether and 0.3 g of benzyltriethylammonium chloride under a nitrogen atmosphere. The mixture is heated to 120° C. for 5 hours under effective stirring to obtain a reaction product of polyepoxide. 600 g polyepoxide is mixed with 400 g of acetone to obtain a 60% resin solution.

EXAMPLES 4 to 7

Preparation of a Polyacrylate

A reactor is charged with 517 g of polyol from Example 1, and 336 g of hexahydrophthalic anhydride under an atmosphere of nitrogen with 5% oxygen. The mixture is heated to 140° C. for 5 hours under effective stirring to obtain a reaction product of carboxyl-functional oligomer. The reactor is cooled to 120° C. and 830 g of bisphenol-A diglycidyl ether, 190 g of methacrylic acid, 0.5 g of toluhydroquinone and 0.5 g of benzyltriethylammonium chloride were added into reactor. The mixture is heated to 115° C. for 10 hours to obtain a polyacrylate.

1080 g of polyacrylate from Example 4 is mixed with 720 g of acetone to obtain a 60% resin solution (Example 5).

790 g of polyacrylate from Example 4 is mixed with 340 g of styrene to obtain a 70% resin solution (Example 6).

400 g of polyacrylate from Example 5 is heated with 10 g of diphenylmethane 4,4'-diisocyanate (MDI) and 0.02 g of dibutyltindilaurate in 50° C. for 5 hours (Example 7).

EXAMPLES 8 to 10

Preparation of a Polyepoxide/Polyacrylate

A reactor is charged with 517 g of carboxyl functional oligomers from Example 2, 556 g of bisphenol-A diglycidyl ether, 64 g of methacrylic acid, 0.2 g of toluhydroquinone and 0.3 g of benzyltriethylammonium chloride under an atmosphere of nitrogen with 5% oxygen. The mixture is heated to 120° C. for 8 hours under effective stirring to obtain a reaction product polyepoxide/polyacrylate.

600 g of polyepoxide/polyacrylate from Example 8 is mixed with 400 g of acetone to obtain a 60% resin solution (Example 9).

440 g of polyepoxide/polyacrylate from Example 9 is heated with 9 g of toluene diisocyanate (TDI) and 0.02 g of dibutyltindilaurate at 50° C. for 5 hours (Example 10).

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. The disclosures of patents, references and publications cited in the application are incorporated by reference herein.

The invention claimed is:

1. An epoxy-functional thermosetting composition containing isocyanurate ring(s), comprising the reaction product of:
    (a) a polyepoxide containing at least two epoxide groups per molecule; and
    (b) a carboxyl functional oligomer comprising the reaction product of an equivalent quantity of:
        (i) a polyol containing isocyanurate ring(s) comprising the reaction product of a tris (2-hydroxyalkyl) isocyanurate or derivative thereof with a modifier selected from the group consisting of caprolactones, alkylene oxides, glycidyl esters, glycidyl ethers, and mixtures therefor, and
        (ii) one or more polycarboxylic acids or acid anhydrides thereof;
    wherein the molar ratio of epoxy functional groups in component (a) to acid functional groups in component (b) is greater than 1.0.

2. The composition according to claim 1, wherein the molar ratio of epoxy functional groups to acid functional groups is greater than 1.5.

3. The composition according to claim 1, wherein said polyepoxide (a) is selected from the group consisting of aliphatic, cycloaliphatic and aromatic polyepoxides which are liquid at ambient temperature (20 to 25°C.) and contain two or more epoxide groups per molecule.

4. The composition according to claim 3, wherein said polyepoxide is derived from a reaction of bisphenol A with epichlorohydrin.

5. The composition according to claim 1, wherein said acid anhydride is selected from the group consisting of maleic anhydride, succinic anhydride, dodecenylsuccinic anhydride, itaconic anhydride, citraconic anhydride, adipic anhydride, hexahydrophthalic anhydride, methylhexahydrophthalic anhydride, nadic anhydride, methylnadic anhydride, tetrahydrophthalic anhydride, methyltetrahydrophthalic anhydride, phthalic anhydride and tetrachlorophthalic anhydride.

6. The composition according to claim 1, wherein said polyol (i) containing one or more isocyanurate rings is the reaction product of a tris (2-hydroxyalkyl) isocyanurate or derivative thereof with a caprolactone.

7. The composition according to claim 1, wherein said tris (2-hydroxyalkyl) isocyanurate is tris (2-hydroxyethyl) isocyanurate or tris (2-hydroxypropyl) isocyanurate.

8. The composition according to claim 1, having a glass transition temperature (Tg) below 50° C.

9. The composition according to claim 1, dissolved in a solvent, a monomer or a mixture thereof.

10. The composition according to claim 1, further comprising a processing aid selected from a solvent and a monomer.

11. The composition according to claim 10, wherein said solvent is acetone and said monomer is styrene, 12. The composition according to claim 1, further comprising an additive selected from the group consisting of organic fillers, inorganic fillers, thixotropic agents, pigments and inhibitors.

13. A molded article, produced by curing a composition as defined according to claim 1.

\* \* \* \* \*